UNITED STATES PATENT OFFICE.

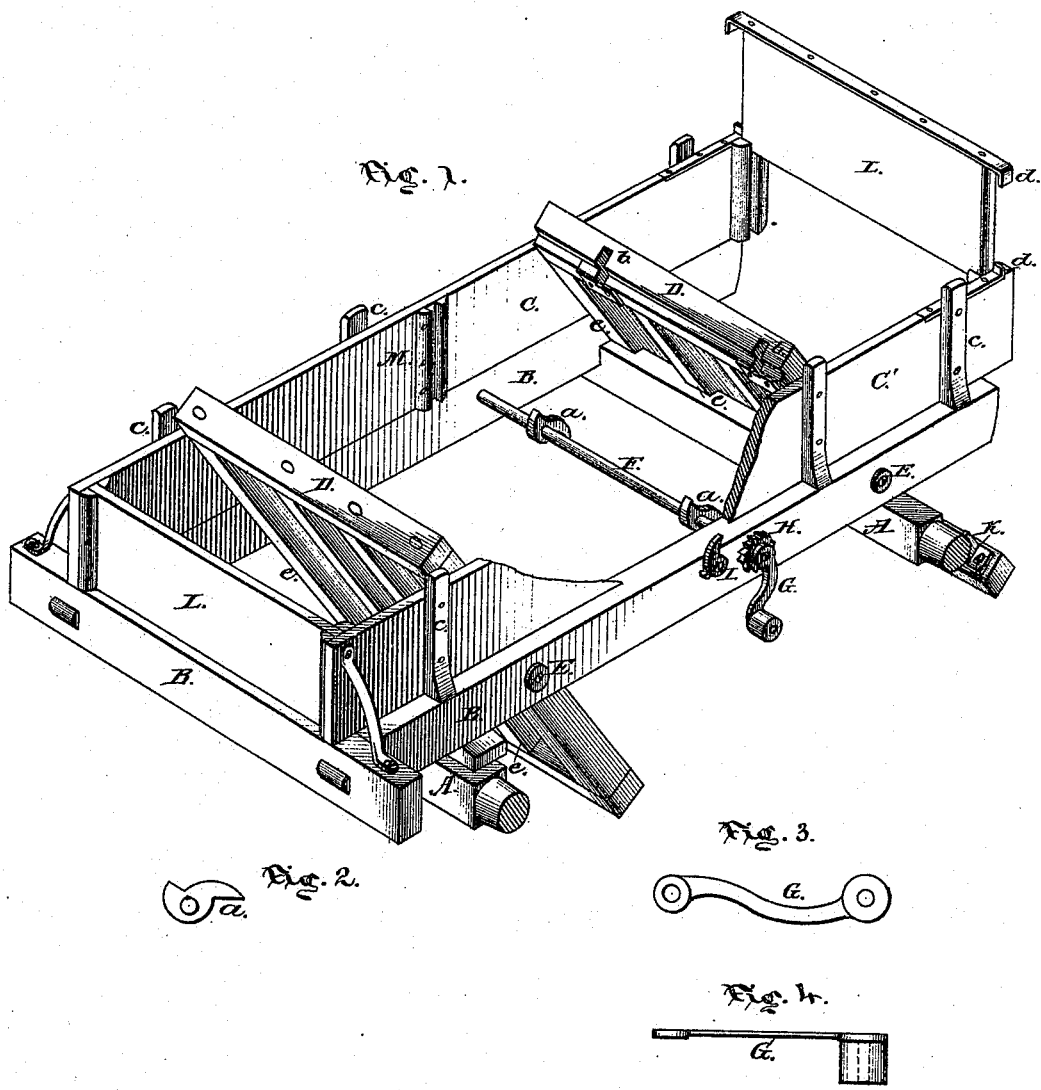

WILLIAM S. BABCOCK AND WILLIAM P. BABCOCK, OF PLAINFIELD, CONN.

IMPROVEMENT IN DUMPING-WAGONS.

Specification forming part of Letters Patent No. 174,462, dated March 7, 1876; application filed December 20, 1875.

*To all whom it may concern:*

Be it known that we, WILLIAM S. BABCOCK and WILLIAM P. BABCOCK, both of the town of Plainfield, in the county of Windham and State of Connecticut, have invented certain new and useful Improvements in Dumping-Wagons; and we do hereby declare that the following is a full, clear, and exact description of the same, reference being had to the accompanying drawing, forming part of this specification, in which—

Figure 1 is a view in perspective, representing the wagon in a tilted position without the supporting-wheels, the axles being cut off. Fig. 2 represents a metallic clutch-hook. Fig. 3 represents a crank, side view; and Fig. 4, a plan of the same.

Similar letters refer to like parts.

The nature of our invention consists in so arranging a wagon as to adapt it to all uses and purposes where wagons and carts are used, and, by a mechanical device, enable the person having it in charge to dump the load easier and quicker than by the usual method.

To enable others to make and use our invention we will proceed to describe its construction and operation.

A A are the axles and bolster. B B are strong bed-timbers. C C' are side-boards bolted to studs $c$ $c$ $c$ $c$, with part of C' cut out to show F $a$ $a$ in drawing. D D represent the bed of wagon-body, made in two parts, each part being provided with slots $b$ $b$ and straps $e$ $e$, into which the clutch-hooks $a$ $a$ hold. E E are strong metallic bolts, (with nuts,) passing through B B and D D, and on which the sections D D tilt or dump; F, a strong metallic rod passing through B B, to which are secured clutch-hooks $a$ $a$, which hold both parts of bed D D firmly when in position for loading. G is a crank for operating F $a$ $a$, as above mentioned; H, a ratchet secured to F; I, pawl to mesh into H to hold F $a$ $a$ and D D in position for loading; K, guide and support to rear end of bed-timbers B B. L is rear end-board elevated to show metallic straps, with hooks $d$ $d$ turned up and down to hold the frame together in connection with guide K. M are cleats bolted on inside of side-boards C to receive end-board, like L, when more than one kind of material is to be carried. In the use of our invention the rear bed is balanced over hind axle on a strong bolt, and on which it tilts without the removal of rear end-board. The forward bed is balanced on a strong bolt, which holds B B from spreading apart, and on which the bed tilts without the removal of forward end-board, the crank with its connections all operating to secure the parts D D in their places after being dumped, as before described. A person having this wagon in charge has only to raise the crank, throw off the pawl, and with a light pressure of the hand or foot on either part of bed to dump the load. It is secured again for loading by bringing the beds back, raising the crank, and throwing on the pawl.

We make no claim to axles, bolsters, side-boards, or studs, for we are aware they are not new; but

We claim—

The bed-timbers B B, the two separate beds D D, bolts E E, rod F $a$ $a$, crank G, ratchet H, pawl I, support K, cleats M, straps $e$ $e$, all substantially as herein set forth.

WILLIAM S. BABCOCK.
WILLIAM P. BABCOCK.

Witnesses:
ELISHA A. MORGAN,
LUCIUS B. MORGAN.